Nov. 17, 1959  A. RANDOLPH-RANDOLPH  2,913,121
BASKET
Filed April 20, 1956  4 Sheets-Sheet 1
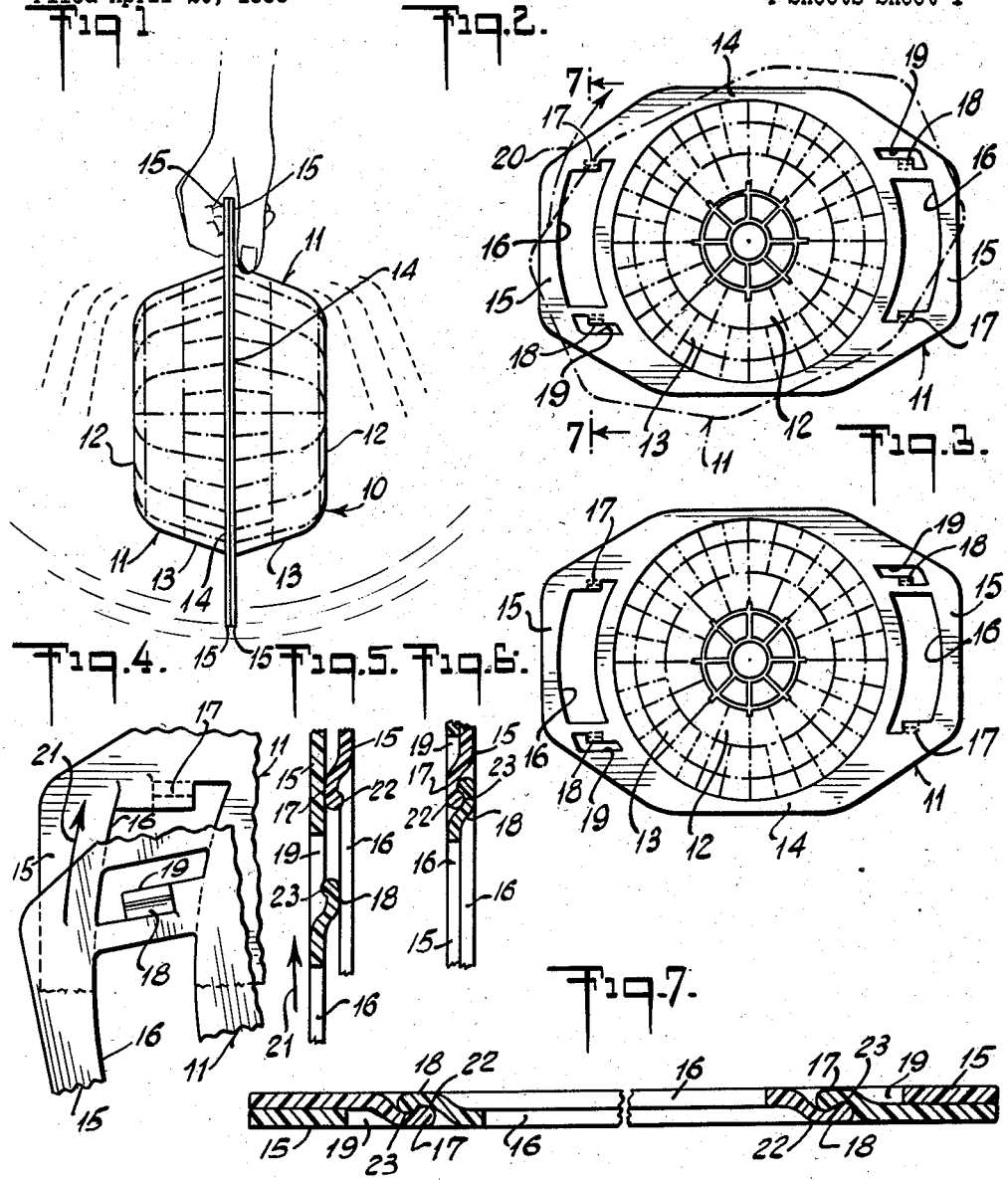
INVENTOR:
ALICE RANDOLPH-RANDOLPH
BY
Watson Johnson Leavenworth & Blair
ATTORNEYS.

Nov. 17, 1959    A. RANDOLPH-RANDOLPH    2,913,121
BASKET
Filed April 20, 1956    4 Sheets-Sheet 2
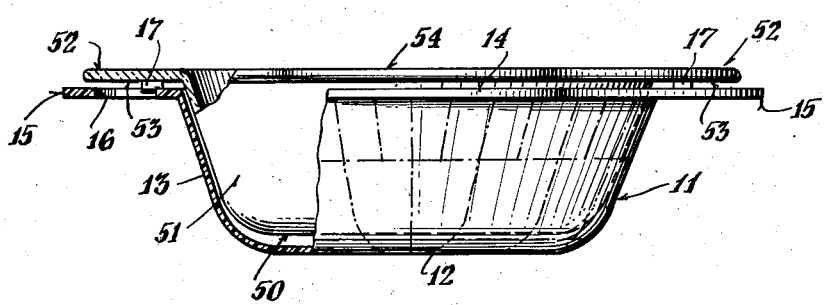
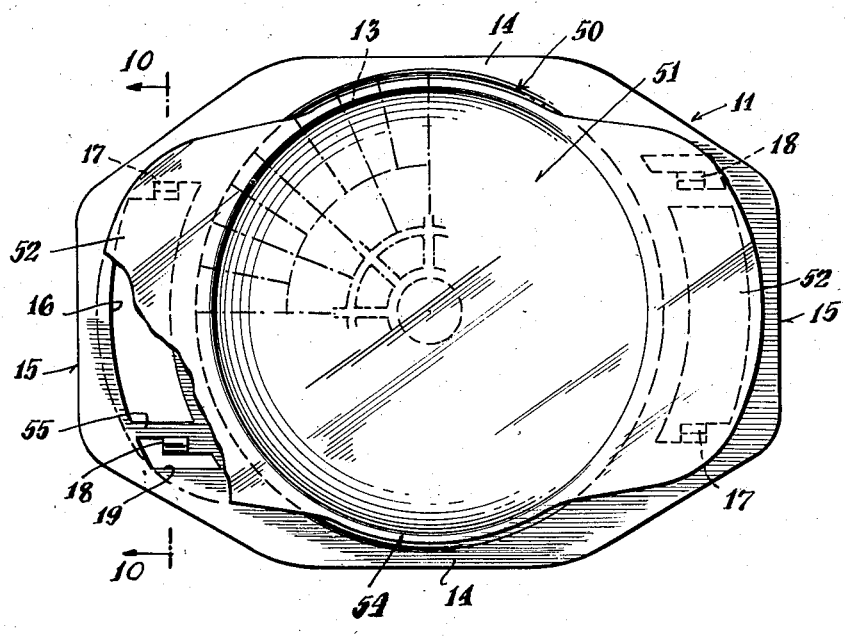
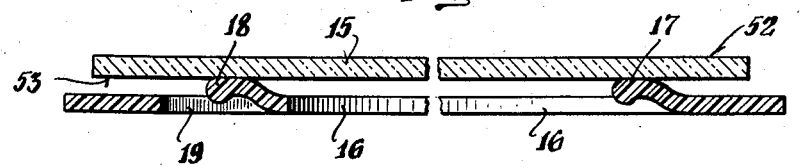

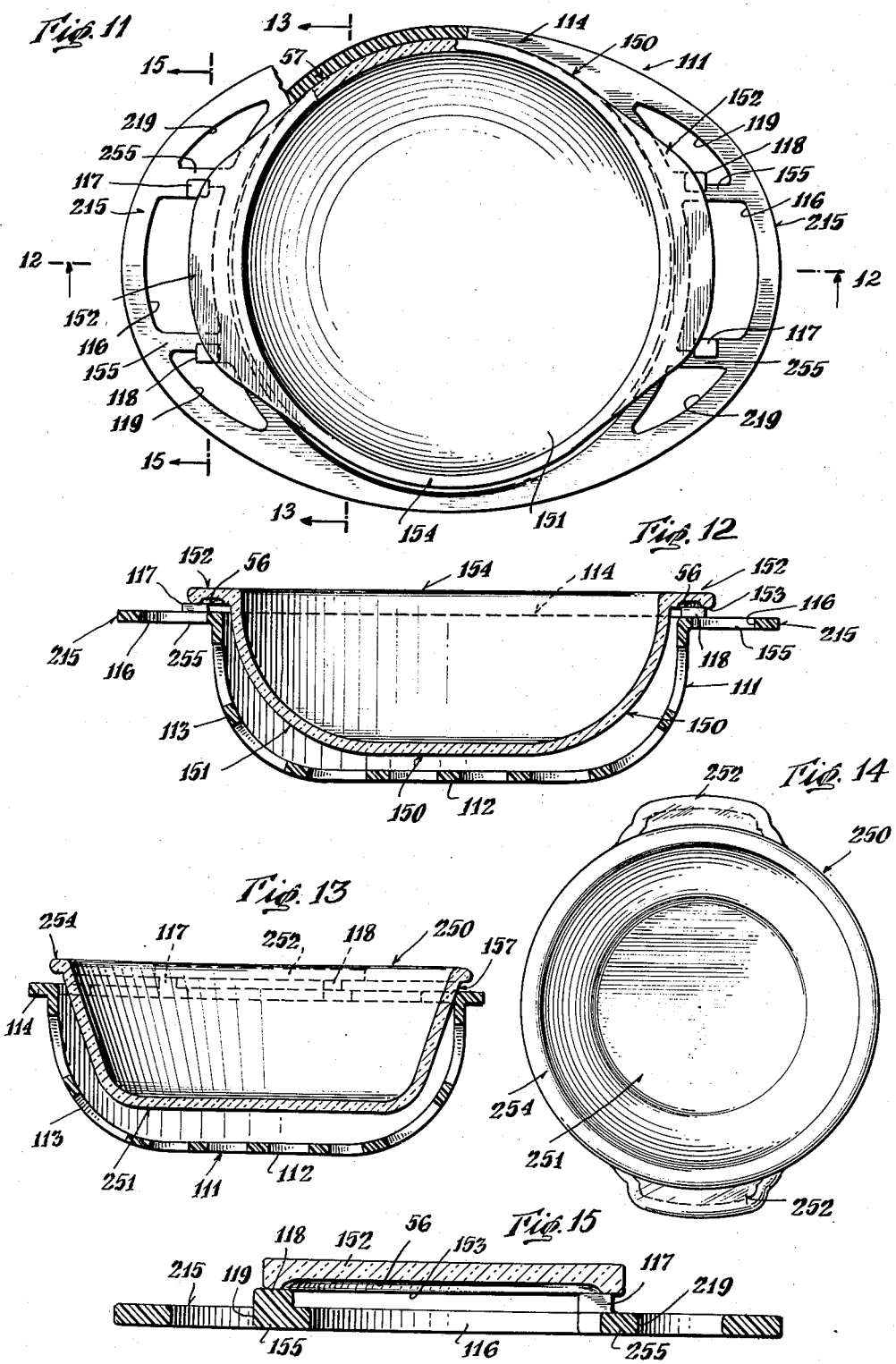

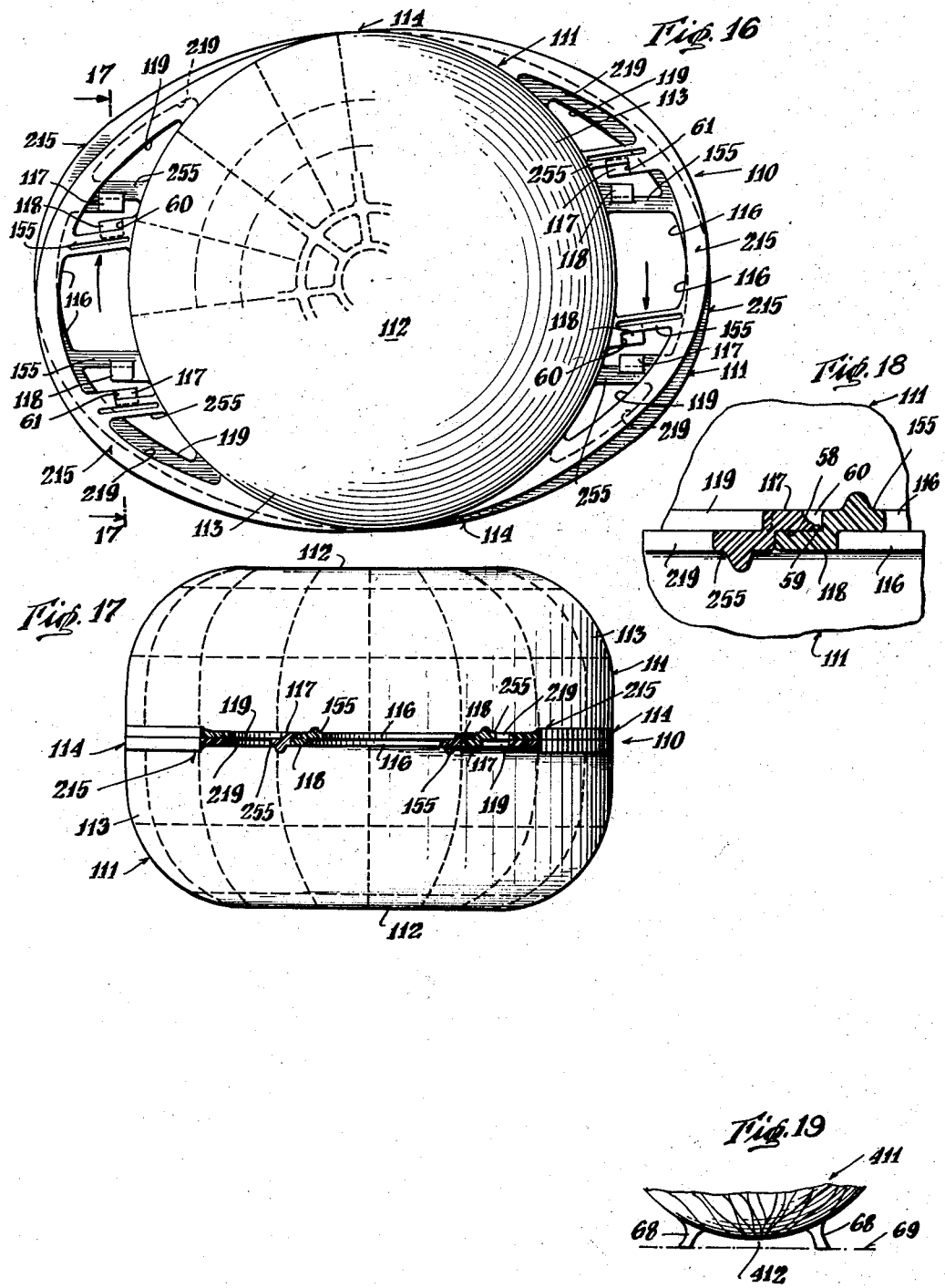

United States Patent Office 2,913,121
Patented Nov. 17, 1959

2,913,121

BASKET

Alice Randolph-Randolph, New York, N.Y.

Application April 20, 1956, Serial No. 579,693

5 Claims. (Cl. 210—470)

The present invention relates to baskets of the open work type permitting passage of fluids through walls thereof, and is a continuation-in-part of my prior application Serial No. 305,187, filed August 19, 1952, and now abandoned.

An object of the present invention is to provide such a basket structure comprising complementary dished halves of substantially rigid perforate or mesh-like construction which may be securely but temporarily fastened or be latched together securely and positively to hold objects or articles therewithin without escape when the device is agitated in any position and while permitting free passage of fluids, such as wash water from within for drainage; preferably equipped with handle means to permit easier grasping and securer holding to allow, when desired, spinning, swinging and whirling advantageously to free liquid from surfaces of contained objects by inertia or centrifugal action.

Another object of the present invention is to provide such a device in a form permitting a wide variety of uses of the complete assembly or the separate halves, the latter in a preferred form constituting detached mesh work dish structures in which a variety of types of articles may be held, stored, displayed, carried or served to advantage.

An additional object of the invention is to provide an open-face dished unit having at least portions of the walls thereof perforated for free passage of fluid medium, such as cooling currents of air, with the rim structure defining the open face carrying appreciably spaced localized lands extending upwardly thereabove appreciable distances to serve as the sole support for lateral structure, such as rim flanges of a bowl, thereby permitting nesting of the latter in the dished unit free from contact with the dished unit main body to minimize heat transfer, so that the dished unit may function effectively as a server. Such bowl support at localized spaced points allows safe nesting in the dished unit of a hot bowl or pan of baked food, such as hot biscuits, macaroni, etc., without undue heating up of the former to permit comfortable handling of the hot bowl or pan without necessitating use of protective pads or other means while permitting rapid cooling of bowl or pan rim structure by surrounding currents of passing air. Heat transfer between the dished unit body and the contacted localized lands preferably is further minimized by location of each of the lands remotely from and/or connected to the nesting body by elements of minimum cross-sectional area at at least one point. Such dished units may thus be made from molded plastic, as may be preferred, without tendency to be unduly discolored or destructively damaged by heat transfer from a hot bowl or pan nested therein and it is believed that the present invention accomplishes this for the first time.

A further object of the invention is to provide such dished units in complementary pairs, preferably molded from plastic, with such raised localized supporting lands on one or both shaped to serve as temporary latching means to hold the paired dished units together in opposed relation to form the enclosing basket device, one or both such units thus at will serving a unique dual purpose.

A still further object of the invention is to provide structural embodiments of such basket device the parts of which may be easily and economically constructed on a mass production basis permitting ready marketing at reasonable prices, and which permit convenient use and efficient operation for a wide variety of uses while assuring maximum simplicity in manipulation of parts temporarily to fasten or to latch them together.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is an elevational view of an embodiment of the open work enclosing basket device of the present invention illustrating manual manipulation thereof during one type of use to which the device is advantageously adapted;

Fig. 2 is a top plan view of one of the two complementary dished halves which, when temporarily fastened together, form the container illustrated in Fig. 1, and suggesting in dot-dash lines an initial relative position of the complementary half prior to relative manipulation to latch the two halves together;

Fig. 3 is a top plan view of the complementary half to be temporarily latched to the half shown in Fig. 2;

Fig. 4 is an enlarged fragmentary detail, with parts broken away, showing an embodiment of latching means which may be used to hold the two halves shown in Figs. 2 and 3 temporarily together, and illustrating them in relative initial positions prior to latching engagement;

Fig. 5 is an enlarged sectional view of the structure shown in Fig. 4;

Fig. 6 is a sectional view similar to Fig. 5 but showing the cooperating latching means brought to latching engagement;

Fig. 7 is an enlarged transverse sectional view, with parts broken away, of the associated rim structures at either end of the two halves shown in Figs. 2 and 3 after they have been brought to latching engagement, the section being taken across the handle loop provided thereby;

Fig. 8 is a side elevational view, with parts broken away and in section, of an open-face dished basket unit of the present invention, preferably in the form of a basket half of the enclosing basket device of the Figs. 1 to 7 incl. embodiment, shown serving as a nesting unit for a bowl which may be a conventional heat-resistant glass baking dish or casserole;

Fig. 9 is a top plan view of the open-face dished unit and the bowl nested therein shown in Fig. 8, with parts of laterally-extending rim structure or flange portions of the bowl which may serve as handles broken away;

Fig. 10 is an enlarged sectional view, taken substantially on line 10—10 of Fig. 9 and with parts broken away, similar to the type of view illustrated in Fig. 7, and illustrating bowl-supporting use of the character illustrated in Fig. 5;

Fig. 11 is a top plan view, with parts broken away and in section, similar to Fig. 9, showing another embodiment of the dished basket unit, which may be one of a pair of duplicate halves latchable together to provide an enclosing basket device of the type illustrated in Fig.

1, and depicting a conventional heat-resistant glass bowl or casserole nested therein;

Fig. 12 is a sectional view taken substantially on line 12—12 of Fig. 11;

Fig. 13 is a sectional view taken substantially on line 13—13 of Fig. 11, but showing nested in the dished basket unit another conventional heat-resistant glass bowl or casserole of a shape somewhat different from that of the casserole depicted in Figs. 11 and 12;

Fig. 14 is a top plan view to reduced scale of the glass casserole shown in Fig. 13;

Fig. 15 is an enlarged sectional view taken substantially on line 15—15 of Fig. 11, and illustrating support by the localized lands on the dished basket half of one of the pair of opposite handle flanges of the Figs. 11 and 12 casserole, which also illustrates the like support thereby of the pair of opposite handle flanges of the Figs. 13 and 14 casserole;

Fig. 16 is a plan view of an embodiment of the enclosing basket device of the present invention, constituting a modified form of that shown in Figs. 1 to 4 inclusive and formed by juxtaposing the rim structures of a pair of the dished basket units illustrated in Figs. 11, 12 and 13, one of the dished units being shown in an initial opposing position relative to the other prior to relative rotary manipulation to interengage localized lands thereof so they may serve as temporary latching elements, some parts of the meshed or perforated walls being broken away and others depicted in outline and dotted form;

Fig. 17 is a sectional view taken substantially on line 17—17 of Fig. 16, showing parts of the meshed walls in elevational outline;

Fig. 18 is a sectional detail of a pair of the interengaged latch elements of the Figs. 16 and 17 embodiment, with parts broken away, illustrating the overlapping relation thereof which holds the pair of dished basket units temporarily together when one is rotated relative to the other from the positions shown in Fig. 16 to the relative positions shown in Fig. 17; and Fig. 19 is a side elevational view, with parts broken away, of an embodiment of the dished basket unit of the present invention, depicting suitable means to support it upright different from the flat bottoms shown in Figs. 1, 9, 13, 14, and 17.

Referring to the drawing, in which tlike numerals identify similar parts throughout, it will be seen that an embodiment 10 of the present invention illustrated in the drawing by way of example, comprises a pair of complementary dished halves 11, 11. Although it is not necessary that the dished halves 11, 11 be exact duplicates of each other, that is preferred, particularly to simplify and assure economy in production. Such duplicate construction of the halves 11, 11 is especially advantageous when they are formed of molded plastic, such as polystyrene or the like, since each mold cavity will serve to turn out both halves of the container.

In the illustrated embodiment, each dished half 11 preferably includes a substantially circular bottom wall 12, a round flared side wall 13, and a rim structure 14 defining its open face. Since, as illustrated in Fig. 1, the rim structures 14, 14 of the complementary halves 11, 11 are to be juxtaposed in face engagement so that the halves may be easily latched together temporarily to form the closed container 10, each rim structure 14 is substantially disposed in a flat plane. At diametrically opposite points, the rim structure 14 is widened and projects laterally an appreciable distance so as to form relatively wide rim portions 15, 15 which may serve as handle means. Each relatively wide rim portion 15 preferably is provided with an elongated slot 16 extending generally normal to a radius of the basket half, as illustrated. Thus, since the halves 11, 11 are substantial duplicates, the slotted rim portions 15, 15 may be brought to substantial registry so that each juxtaposed pair of loop handles 15, 15 at one side of the container 10 together serve as a single handle loop through which one's fingers may be extended to facilitate grasping and holding the device in one's hand, as illustrated in Fig. 1. It is to be understood, however, that any suitable handle means, permanently attached or detachable, may be provided within the scope of the present invention to permit the container to be manipulated, swung or whirled as may be dictated by the particular use to which the container is put, whether the device is to be held in one's hand or suspended from suitable means.

As best seen in Figs. 2 and 3, each basket half 11 is of perforate or mesh-like construction so as to accomplish any desired decorative effect and to permit ready passage through its walls or portions thereof of fluids, such as washing liquids, etc. As illustrated in Figs. 2 and 3, partly in full lines and partly in dot-dash lines, the mesh-like construction may comprise a plurality of concentric strips tied together by radiating strips, which, of course, will be made integral when the structure is molded from suitable plastic material. The particular areas which are perforated and the shapes of the mesh-work and the perforations formed thereby, of course, are of no moment with regard to the present invention and any particular design may be selected to accomplish any decorative end or ornamental effect desired. Further, although the side walls of each basket half are shown in the illustrated embodiment as being round and flared, they may be any desired shape, such as oblong, rectangular, etc. The flaring of the side walls 13, of course, permits ready nesting of the halves 11, 11 to facilitate packing and storage. Each half may also serve by itself as a mesh basket to hold, display, or carry articles for a variety of purposes and, for example, may be advantageously used as a server for hot biscuits, cold desserts, etc.

In the embodiment illustrated in Figs. 1 to 7 incl., the latch means comprises complementary elements 17, 17 and 18, 18 providing inter-engaging camming lips formed as offset portions, as best seen from Figs. 5, 6 and 7. The latching elements 17, 17 are formed as integral parts of the edges of certain ends of handle loop slots 16, 16. At opposite ends of the slots 16, 16, the handle rim portions 15, 15 are each provided with an L-shaped slot 19, an edge of which forms the integral offset latching element 18, as best seen from Figs. 4, 5, 6 and 7.

With the two halves 11, 11 inverted with respect to each other and juxtaposed with their rim structures 14, 14 oriented in the manner similar to that suggested in full and dot-dash lines in Fig. 2, and as illustrated in Fig. 4, each cooperating pair of latching elements 17, 18 will form complementary hook members opposed to each other, as is indicated in Figs. 4 and 5. Then, when one half 11 is rotated relative to the other in the direction of the dot-dash arrow 20 shown in Fig. 2 and the full line arrow 21 shown in Figs. 4 and 5, the latch hooks 17, 17 on one half 11 will be permitted to move into the slots 19, 19 of the other half and then to cam over and snap into engagement with the complementary latching hooks 18, 18 of the latter half.

This snap engagement, to obtain temporary securement of the complementary halves 11, 11 together, is permitted either by curving inwardly or thickening the tips of the latch hooks 17 and 18 respectively at 22 and 23, as illustrated in Figs. 5, 6 and 7. As the latch hooks 17, 17 of one half 11 are slid laterally to apposition of slots 19, 19 of the other half 11, those hooks will drop at least partially into those slots. Thereafter, as the opposed noses of complementary pairs 17 and 18 of the latch hooks are rotated further toward each other their opposed rounded noses 22 and 23 will be first cammed outwardly in opposite directions by each other to pass, and then will interlock or nest as indicated in Figs. 6 and 7. The material from which those latching portions 17 and 18 of the basket halves 11, 11 are made should thus be resilient, or of a character permitting such flexing and recovery, a characteristic of many hard moldable plastics. Thus, the complementary pairs of latch hooks 17 and 18 will spring or snap into secure latching inter-engagement securely to hold the basket halves 11, 11 together temporarily with relative rotation of the latter in one direction (such as clockwise as viewed in Figs. 2 and 4), and can readily be sprung or snapped out of engagement with relative rotation in the opposite direction to permit the basket halves to be separated.

In use and operation of the embodiment of the device shown by way of example in Figs. 1 to 7 incl. of the drawings, one may employ it to advantage as a culinary aid. For example, it may be used to free excess amounts of wash water from greens. In the preparation of a tossed salad, one may place the independently and thoroughly washed leaves of greens in one of the basket halves 11 and then place the other basket half in inverted position thereover and rotate them relative to each other to secure the latching engagement illustrated in Figs. 4 to 7 incl. The resulting container 10 may then be picked up from either side, such as in the manner illustrated in Fig. 1, and whirled or swung back and forth centrifugally to free excess wash water from the enclosed greens. Thereafter, the basket halves 11, 11 may be easily freed from each other in the manner indicated above to allow the dry leaves to be removed. The separated basket halves provide useful separate open-face baskets for various purposes and they are readily nestable for easy storage. For example, in one form while the assembled unit may serve advantageously as a greens dryer, its two separate halves may be used to advantage as decorative table accessories.

As shown in Figs. 8 and 9, and as is more clearly apparent from Fig. 10, the upwardly projecting camming lips 17, 17 and 18, 18 of the basket half 11, which are to serve as latch elements for interengagement with like camming lips of the opposed basket half, as illustrated in Fig. 7, form lands upon which diametrically-opposed, laterally-extending rim handles 52, 52 of a dish 50 may rest to permit ready nesting of the basin 51 of the dish in the basket half. This function was illustrated in Fig. 5, wherein it is indicated that the latch elements 17 and 18, which project laterally out away from the outside face of the laterally-extending portions 15, 15 of the basket rim 14, serve as extending projecting means to space from the outside face of this rim structure any flat, plate-like structure, such as the rim of the opposed basket. It is this functional characteristic inherent in the embodiment of Figs. 1 to 7 incl. and which was illustrated in Fig. 5, which makes possible the advantageous bowl-supporting operation illustrated in Figs. 8, 9 and 10.

It will thus be seen from Figs. 8, 9 and 10 that the dished basket unit 11 has a substantially flat bottom 12 to rest upon a horizontal surface, such as a table top, for support of the unit in the upright position shown in Fig. 8, with its rim structure 17 substantially disposed in a horizontal flat plane. The widened portions 15, 15 of the rim structure 14, on diametrically opposite sides of the body proper or basket basin defined by perforated or meshed sidewall 13, serve as convenient handles for manual handling and transport. The latch elements 17, 17 and 18, 18 constitute a plurality of upwardly-extending localized lands mounted on and spaced from each other appreciable distances less than 180° about the rim structure 14 with each having a top end for support of lateral structure in the form of lateral flange portions 52, 52 of rim structure 54 of the bowl or casserole 50. The localized lands 17, 17 and 18, 18 extend upwardly appreciable distances from the flat plane of the dished unit rim structure proper to dispose their top ends in a common flat plane substantially parallel to and appreciably above the rim structure plane for support there of the under-surface 53 of the rim structure of the bowl or casserole 50, as shown in Figs. 8, 9 and 10. As a result the exterior surfaces of the basin 51 of the bowl 50 are held spaced at substantially all points from the body proper of dished basket unit 11 to limit heat transfer thereto from the bowl by way of the small localized supporting lands, as indicated in Fig. 8. This is highly important if bowl 50 is a heat-resistant glass baking dish or casserole, or other baking or cooking bowl or pan, in which food has been baked or cooked and is promptly transferred while hot, as it comes from the stove or out of the oven, directly into the dished basket or nesting unit 11, particularly if the latter be molded from plastic, such as polystyrene or other suitable plastic material, as is preferred. By having the localized lands 17, 17 and 18, 18 formed on the widened rim flange portions 15, 15 they can be offset appreciable distances laterally outward from the body proper of the dished basket unit 11, and this limits heat transfer to the latter. The relatively small areas of contact between the under-surface 53 of the rim structure of the dish 50 and the top ends of these localized lands also limit heat transfer. Also the upward offsetting of each land additionally lengthens the path of heat transfer and the structure intervening a land top end and the basket body proper is limited in cross-sectional area at at least some intermediate point for a like purpose of limiting heat transfer. For example, as will be understood from Figs. 9 and 10, the stock of each offset land 17 or 18 where it is integrally connected to the rim flange portion 15 is of limited cross-sectional area. Also, each land 17 is formed on the inside edge of a laterally-outward side element of the handle loop formed by the transverse slotting at 16 of the flange portion 15, and each land 18 is formed on a side edge of a bar element 55 of limited cross-sectional area extending laterally-outward and defined on one side by the handle loop slot 16 and on the other side by small slot 19. These characteristics are supplemented by the additional features of each dish handle flange projecting laterally an appreciable distance away from the hot body of food in the bowl or casserole basin 51 to begin cooling rapidly upon removal of the dish from the source of heat, each cooling dish handle flange having practically point support at two appreciably spaced points on a pair of the localized lands located radially outward at appreciable distances from the basket body proper, and the spacing of the hot bowl or casserole at practically all points from the dished basket unit to be substantially surrounded by cooling currents of air. Consequently, nesting of such a hot loaded bowl or casserole becomes practical and safe even though the nesting basket be molded from plastic easily damaged by heat. This has been demonstrated repeatedly. Of course, such limiting of heat transfer operates effectively in reversed situations where the nested bowl carries chilled products, such as a quantity of ice cubes, and one does not wish to have warmth of the nesting basket withdrawn to develop chill to one's hands grasping the basket handles or to a surface on which the basket is rested, such as a table top.

A practical embodiment of the open work basket device in the form of an open-face dished body to function as a nesting server is illustrated in Figs. 11 to 13 incl. and Fig. 15; in Figs. 16 to 18 incl. is illustrated how two such dished bodies may be temporarily latched together to form an enclosing basket device of the present invention. Referring to Figs. 11, 12 and 15, it will be seen that the dished body 111 there illustrated, which may be readily molded as a unit structure from any suitable plastic material, such as high impact polystyrene, comprises a body proper or basin defined by a bottom wall 112 (which is preferably flat to rest upon a flat surface) and a circumambient sloping sidewall 113 terminating in a circumambient rim structure 114. Preferably, as shown, the basin of the dished body 111 is circular in cross-section and the rim structure 114 is thus also circular although, as previously indicated, the cross-sectional shape of the dished unit or body may be varied as may be desired. On diametrically opposite sides, the rim structure 114 is widened outwardly or provided with laterally-extending flanges 215, 215 which may serve as handle portions. For this purpose, each widened rim portion or lateral flange 215 is transversely slotted at 116, and additional flanking slots 119 and 219 provide therewith outwardly-extending lateral bar elements 155 and 255 with the stock thereof connected to the rim structure proper being of limited cross-sectional area. Along the side edge of bar element 255 which defines one end of the transverse slot 116 is formed a localized land 117 which may, if desired, serve as an offset lip portion or hook element as explained later in connection with Figs. 16 to 18 incl. Along the side edge of bar element 155 which defines an end of the slot 119 is also provided localized land 118 which may have the dual function of land 117. As will be seen from Fig. 11 the top end of each land 117 or 118 is of limited and relatively small area to limit contact thereof by superstructure rested thereon.

The open-face dished body or basket unit 111 is adapted to function as a server and thus for nesting therein a bowl, dish, pan or casserole, which may be of conventional construction, and as indicated in Figs. 11, 12 and 15, the nested unit may be in the form of a heat-resistant glass casserole 150 of well-known shape and dimensions. The casserole 150 has a dished basin 151 surrounded by a rim structure 154 which at diametrically opposite points carries laterally-extending rim flanges 152, 152 to serve as handles. It will be noted from Figs. 11, 12 and 15 that each laterally-extending casserole handle 152 rests upon a pair of the localized lands 117 and 118 for limited contact with the nesting basket structure or, more specifically, each handle structure 215 of the latter. Incidentally, the handle flanges 152, 152 of the conventional casserole 150 are molded with a curved groove 56 in the under-face thereof to facilitate grasping by one's fingers. This groove of the under-face of each of the casserole handles 152 further limits the area of contact between it and the lands 117 and 118, as will be understood from Figs. 12 and 15, so that heat transfer is greatly minimized.

The internal diameter of the rim structure 114 of the nesting dished body or basket unit 111 is somewhat greater than the outer diameter of the rim structure 154 of the casserole 150. Consequently, the outer surface of the sidewall of the casserole basin 151, as well as its bottom, is spaced appreciably from the inner wall of the body proper of the nesting basket 111, and it has been observed that there is quite frequently a natural tendency for the nested casserole to be so centered in the nesting basket unit as to be free of contact therewith at all points except at the four localized supporting lands 117, 117 and 118, 118. However, should the casserole 150 be eccentrically mounted in the nesting basket unit 111 so as to provide contact between sidewalls thereof at some one point, as illustrated in Fig. 11 with contact being indicated at point 57, the area of contact there is very small and the heat transfer at that point has been found to be below the amount which would destructively damage the basket. This is due to the fact that the casserole is surrounded by passing currents of cooling air having ingress through perforations in the basket as may be provided by mesh-like construction of the bottom and sidewalls 112 and 113 thereof and having egress about the raised casserole rim structure 154 except at the four points of contact with the four localized lands 117, 117 and 118, 118 and the point of side contact at 57. It will be seen from Figs. 12 and 15 that while the top surface of the major portions of the rim structure 114 of the nesting basket unit 111 are substantially disposed in a flat plane the under surface 153 of the rim structure 154 of the casserole is appreciably raised thereabove to another flat plane by the four points of contact with the four localized lands which are less than 180° apart and have their top ends substantially located in the second flat plane. Due to the small areas of contact at the localized lands 117, 117 and 118, 118, heat transfer to the latter from the casserole handles 152, 152 is quite limited. Also surrounding currents of air rapidly cool the laterally projecting casserole handles 152, 152 to limit such heat transfer and the localized lands are connected to the body proper of the nesting basket unit 111 by elements of minimum cross-sectional area at at least one point to minimize heat transfer therefrom to the basket body; the lands are of limited cross-sectional area and are connected to the bar elements 155 and 255 by structure of limited cross-sectional area and the latter are likewise connected to the rim structure proper of the basket unit through plastic stock of limited cross-sectional area. Many have skeptically questioned the possibility of nesting in the basket unit of Figs. 11, 12, 13 and 15 a hot casserole loaded with baked food immediately as it was removed from the oven without undue damage to the basket and have been surprised by the demonstrations which invariably showed that there is no undue damage to such a backet by such a hot loaded casserole. Although it is thought that the theory of this success is that outlined above, the fact does remain that for those reasons or due to some other unknown characteristics inherent in the structure of such nesting basket unit no undue damage is caused thereby by repetitious nesting therein of such hot loaded casseroles even though the basket unit is molded from low heat-resisting polystyrene plastic of no unique formulation.

A slightly different shape of casserole is illustrated at 250 in Figs. 13 and 14 and this is also a conventional heat resistant glass casserole. The form illustrated in Figs. 11 and 12 and the additional form illustrated in Figs. 13 and 14 together are said to enjoy over 90% of the market of heat-resistant glass casseroles in the United States and, as there demonstrated, the embodiment of the basket unit 111 illustrated in Figs. 11, 12, 13 and 15 is equally adapted to nest therein such casseroles with limited point contacts at the localized lands 117, 117 and 118, 118. Incidentally, other brands of conventional heat-resistant glass casseroles which command an appreciable amount of the small remainder of the market also are nestable in this embodiment of the basket unit in like fashion characterized by limited point contact on the raised lands, and thus this basket unit is of an all purpose nature for the nesting of baking casseroles therein, i.e., to function as a server jacket therefor. As shown in Fig. 13, the casserole 250 when nested in the basket unit 111 also has its basin 251 spaced from the body proper of the basket and, since experience has taught that there is a natural tendency for the casserole to be centered in the basket with no sidewall contact at any point, contact is usually limited to the top ends of the four localized lands 117, 117 and 118, 118 shown on which the diametrically-opposite laterally-extending handle flanges 252, 252 of the casserole 250 rest. However, in the event that the casserole 250 may be acentrically nested in the basket unit 111 there would be only some one point of minimum contact of the casserole sidewall with the rim structure 114 of the basket, such as that indicated at 157 in Fig. 13, and it has been found that any such limited point of sidewall contact causes no undue damage to the nesting basket.

As indicated in Figs. 16, 17 and 18, an embodiment 110 of the open-work enclosing basket device of the present invention may be formed readily from two of the basket units 111, 111. As indicated in Fig. 16, the two basket units 111, 111 will be arranged in opposed relation to each other with their rim structures 114, 114 juxtaposed to each other. Initially they will be arranged in different relative angular positions, as indicated in Fig. 16, so that the localized lands 117 and 118 of each of the four sets of paired localized lands will be laterally offset from each other as shown. In such relative positions the offset lip portions or hook elements which are provided by the localized lands 117—117 and 118—118 are now adapted to serve as interengageable latch elements. Upon rotating one of the basket units 111 relative to the other to bring to exact alignment the handle portions 215—215 of the two opposed basket units, such as by rotating the top basket unit clockwise relative to the bottom basket unit as viewed in Fig. 16, each offset localized land 117 will be hooked over its opposed offset localized land 118 in overlapping relation, as illustrated in Fig. 17 so that the flat under contact face 58 of the offset lip portion or hook element 117 is frictionally engaged against the similar face 59 of the complementary offset lip portion or hook element 118, as will be seen best from detailed Fig. 18.

The opposed pair of basket halves or units 111, 111 will remain securely latched together when so manipulated relative to each other, so that the resulting enclosing basket device may be swung and whirled about with assurance that the two halves will remain in their relative latched positions until they are purposely manipulated relative to each other in the reverse direction to unlatch them. This secure latching together of the opposed basket halves or units 111, 111 is further assured by providing a transverse shoulder 60 on each of the bar elements 155—155 flanking the inward side of the contact face 59 of latch element 118 and a similar transverse shoulder 61 facing in the opposite direction is provided on each of the bar elements 255—255 along the outward side of the contact face 58 of each latch element 117. Thus when the latch elements 117 and 118 each complementary pair thereof are interengaged by sliding their contacts faces 58 and 59 over each other to overlapped relation, the inner free side edge of the contact face 58 of latch element 117 rides alongside the shoulder 60 and the free outer side edge of the contact face 59 of the latch element 118 rides alongside shoulder 61. Consequently, the two basket halves 111, 111 when latched together in the manner indicated in Fig. 17 remain in substantially coaxial relative positions, thereby avoiding accidental unlatching during manipulation of the resulting enclosing basket device 110.

It will be seen from Figs. 2, 3, 16 and 17 that embodiments of the open-work enclosing basket device of the present invention preferably may have four sets of interengaging latching means with two thereof on one side being circumambiently spaced appreciably and there located opposite the other two hereof across the faces of the basket halves and not necessarily at diametrically-opposite points. While four such latching means are preferred, it will be understood that two thereof located substantially at diametrically opposite points would be sufficient to keep the basket halves securely together. Also it will be understood that three sets of such latching means may be located at points circumambiently-spaced about the rim structures at appreciable distances, such as about 120° apart, securely to hold the basket halves together; and, of course, a greater number may be employed located at circumambiently spaced points about the rim structures for the same purpose. The open-work enclosing basket device of the present invention may be embodied in a form wherein such latching means is employed on one side with the opposite sides of the rim structures being held together by grasping substantially aligned handle means. For example, in the assembly of Fig. 16 one might retain the two pairs of latching elements 117, 118 and 117, 118 on the left side of the structure and dispense with them on the right side, so that after the two pairs of latching means were engaged on the left side of the structure and the opposed handles 215, 215 of the two basket halves on the right side of the structure were moved to substantial alignment with each other, grasp of the latter together would hold the latching elements in engagement and keep the two basket halves firmly latched together.

It is to be understood that means to hold one of the basket units upright so that it may be used as a nesting server jacket is not limited to the use of a flat bottom, such as that employed in the embodiments of Figs. 1, 8, 12 and 13, since any suitable means, conventional or otherwise, may be employed for this purpose. As illustrated in Fig. 19 such a basket unit 411 may have a rounded bottom 412 carrying a plurality of projections or relatively short legs 68—68, which may be three, four or more in number, employed to assure that the basket unit, which is to serve as a nesting server jacket, will rest upright on a flat surface, such as a table top, diagrammatically indicated by the dot-dash line at 69. It is to be understood that the localized lands which are to support in raised fashion rims of nested bowls, casseroles, pans and the like, may be in a variety of forms, such as curved hook members as proposed in Figs. 1 to 7 inclusive and 8 and 10 inclusive or as offset rectangular pads having generally flat-topped surfaces as proposed in Figs. 11 to 13 inclusive and 15 to 18 inclusive, as well as in other equivalent forms, e.g., shapes having rounded tops, raised elements having enlarged heads and reduced shanks, loops having lateral holes extending therethrough and various other functional shapes which may be in a variety of ornamental forms. Also, as indicated above, the placement of such localized lands is not limited to mounting upon laterally-extending handle structures nor to location thereof at diametrically-opposite points since they may be distributed at suitable circumambiently-spaced points about the rim structures at less than 180° apart where they will assure secure elevated support of rim structures of nested bowls, and the like, and when used as complementary latch elements will assure that complementary basket halves will be securely held together in opposed relation thereby.

It will thus be seen that the objects set forth above, among those made apparent from the preceding description are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An open work enclosing basket device comprising, in combination, a pair of reversed and opposed separate complementary single-piece plastic half units with each being of dished formation having at least portions of the walls thereof perforated for free passage of fluid medium and with the side walls of each terminating in a circumambient, relatively rigid rim structure substantially located in a flat plane, transversely-extending outwardly-projecting flange means on the rim structures of said reversed half units with that of each half unit having portions thereof located at circumambiently-spaced points about the rim structure of each half unit, said flange means portions of one half unit being juxtaposed in opposed lapped relation to those of the other half unit along a common flat plane of junction, said transversely-extending opposed flange means portions carrying cooperating elements of a plurality of latch means located at circumambiently-spaced points about said rim structures with said elements of each of said latch means being in the form of localized lands, each localized land latch element being offset outwardly beyond said common flat plane of junction away from the flange means portion supporting it and being in the shape of a laterally-extending hook, said latch element hooks of one half unit constituting one set thereof extending laterally in one direction circumambiently of its rim structure and those of the other half unit constituting a second set thereof extending laterally in the reverse direction and with said hooks of one set paired with those of the other set and disengageably hooked together in pairs by relative rotation of said half units in one direction, said pairs of latch element hooks being disengageable upon relative reverse rotation of said reversed half units.

2. An open work enclosing basket device comprising, in combination; separate, like, complementary, dished, nestable single-piece plastic halves of mesh construction temporarily fastened together in opposed open face relation to form a perforate closed container, each half having a lateral rim disposed substantially in a flat plane and defining an open face with a pair of opposed diametrically located portions thereof extending laterally-outward in a radial direction appreciable distances and forming relatively wide, localized flange portions; each of said localized flange portions having an elongated slot extending therethrough generally normal to radii of said basket halves to serve as a handle loop providing each basket half with a pair of said handle loops, the pair of said handle loops on one basket half being in substantial registry with the pair of said handle loops on the other basket half with said halves latched together temporarily; and latch means comprising interengageable outwardly-offset lip portions of the rims of said basket halves located on each of said localized flange portions with those of each basket half extending outward toward the other in the direction of the depth of the basket half, the offset lip portions of one basket half being rotated to latching engagement of those of the other half by rotation of said halves in one direction relative to each other with their rims in opposed contact, said interengaged offset latching lip portions being disengageable upon relative reverse rotation of said basket halves.

3. An open work basket device molded from relatively low heat conducting plastic material and comprising an open-face dished single-piece body of perforated construction for free passage of fluid medium and with its side walls terminating in a circumambient, relatively shape-retaining rim structure with the latter disposed substantially in a flat plane, said body having a bottom portion of a construction adapted securely to support said dished body upright; and a number greater than two of integral, upwardly-extending localized and isolated lands mounted on said rim structure and spaced appreciably from each other less than 180° circumambiently of said rim structure, each of said lands having a relatively small, structure-supporting free top end of small lateral area disposed substantially in a flat plane located an appreciable distance above and substantially parallel to the first-mentioned plane of said rim structure, said lands having their small structure-supporting top ends free from direct connection with each other and with each of said top ends being connected by integral plastic stock down to said rim structure through a point where the plastic stock is of minimum cross-sectional area appreciably limiting heat transfer between said top end and said rim structure.

4. An open work, unitary, molded plastic basket device of appreciable rigidity comprising an open-face dished body of mesh construction for free passage of fluid medium and with its side walls terminating in a circumambient, relatively rigid rim structure with the latter disposed substantially in a flat plane, the bottom portion of said dished body being of a shape adapted securely to support said dished body upright with the plane of said rim structure being disposed substantially parallel to a top flat surface of a supporting structure; portions of said rim structure on opposite sides across the open face from each other having outwardly-extending transversely-disposed rim flanges slotted to serve as manual handles; and a plurality of at least four localized, upwardly-extending lands spaced appreciably from each other circumambiently of said rim structure and integrally formed on said handle flanges for support thereby with each land isolated from and disconnected with respect to all of the other lands other than through their supporting rim structure and the handle flanges of the latter, the top surfaces of said lands being relatively small and substantially disposed in a flat plane spaced appreciably above the first-mentioned flat plane of said rim structure to serve as isolated means for supporting cooperatively lateral rim flange structure of a bowl and the like, the integral plastic stock intervening each of the structure-supporting top surface of each land and said rim structure being at some point of minimum cross-sectional area to minimize heat transfer therebetween, said localized projections being circumambiently spaced from each other less than 180° with each of said lands comprising a latch element for interengagement in temporary interlocking fashion with a complementary latch element of a similar dished device when juxtaposed thereto in face-to-face relation.

5. An open work basket device comprising an open-face dished molded plastic single-piece unit of mesh construction having a rim disposed substantially in a flat plane and a bottom structure shaped to support said unit upright, portions of said rim on generally diametrically opposite sides of the open face of said unit being radially wider and extending laterally outward in a radial direction appreciable distances to serve as handles on the opposite sides of the unit open face, each of said wide handle portions having a laterally-spaced pair of upwardly-extending localized and isolated projections integrally formed thereon with said localized projections of both said handle portions substantially terminating in top structure-supporting small ends disposed in another common flat plane spaced above the first-mentioned rim plane with said structure-supporting top ends being disconnected with respect to each other by means other than the remaining upwardly-extending portions of said projections and the rim and handle portions on which said projections are integrally formed, the localized projections of said two pairs thereof being circumambiently spaced from each other less than 180° with each of said localized projections comprising a latch element for interengagement in temporary interlocking fashion with a complementary latch element of a similar dished unit when juxtaposed thereto in face-to-face relation.

References Cited in the file of this patent
UNITED STATES PATENTS

| | | |
|---|---|---|
| 1,067,290 | Washburn | July 15, 1913 |
| 1,257,119 | Reynolds | Feb. 19, 1918 |
| 1,470,521 | Combest | Oct. 9, 1923 |
| 1,470,579 | Rohdiek | Oct. 9, 1923 |
| 1,528,713 | Weirick | Mar. 3, 1925 |
| 1,678,166 | Repay | July 24, 1928 |
| 2,663,172 | Yellin | Dec. 22, 1953 |